UNITED STATES PATENT OFFICE.

GEORGE W. NICHOLLS AND THOMAS H. BILYEU, OF LITCHFIELD, ILLINOIS.

IMPROVEMENT IN COMPOSITIONS FOR FUMIGATING PURPOSES.

Specification forming part of Letters Patent No. 223,004, dated December 30, 1879; application filed August 16, 1879.

*To all whom it may concern:*

Be it known that we, GEORGE W. NICHOLLS and THOMAS H. BILYEU, of Litchfield, in the county of Montgomery and State of Illinois, have invented certain new and useful Improvements in Compositions for Fumigating; and we do hereby declare that the following is a full, clear, and exact description of the invention, which will enable others skilled in the art to which it appertains to make and use the same.

This invention relates to an improved and new compound to be employed in disinfecting and purifying the air in cisterns, cellars, &c., and for impregnating and purifying water for drinking, bathing, and other purposes, and to be used in the preservation of animal and vegetable substances.

It consists in a composition of saltpeter, brimstone, or sulphur, and licorice-root, taken in about the proportions and used in the manner hereinafter set forth.

We take of saltpeter two parts, sulphur or pulverized brimstone eight parts, and pulverized licorice-root two parts, which ingredients are thoroughly mixed together and compose the compound employed by us for the several purposes indicated, with one or two slight deviations, which will be hereinafter specified.

This compound is used as follows: To purify the air of an apartment—as, for example, of a cellar or other apartment in which the air is foul—the room should be first prepared so that it can be closed, as nearly as practicable, air-tight. A portion of the compound is put on a suitable dish, and is placed in said apartment and ignited, after which the room is closed. The compound will burn with a steady and regular blaze until all is consumed. The gas generated from the burned compound penetrates the air and destroys all poisonous and foul gases, and all germs of animal life which may be in the air or on the walls of the apartment. The apartment should be kept closed for twenty-four hours or thereabout.

In purifying a cistern it should be covered air-tight and kept so for twenty-four hours to retain the gas-fumes of the burned compound in contact with the water. All animal life which may be in the water will be destroyed and precipitated to the bottom, as well as vegetable matter held therein. Water held in casks or other vessels may also be thus treated and purified.

One of the greatest results of our discovery lies in its preservative properties for animal and vegetable substances. This is accomplished by first purifying and impregnating the water in tight vessels, as hereinbefore described, and submerging therein the articles to be preserved. Or the said articles are themselves impregnated by being subjected to the action of the gas from the burned compound in an air-tight vessel of from four to six or ten hours, and they will be preserved without sealing in air-tight vessels. If the vessels containing the articles to be preserved contain air largely impregnated with the gas from the burned compound, the preservation of the said articles will be, if possible, more perfect.

Large fruits or vegetables containing much juice or sap are best preserved in the impregnated water hereinbefore described, while small fruits, after being subjected to the gas of burned compound, will cover themselves with their own juice.

We do not deem it necessary to explain any particular form of vessel nor manner of arranging the same for use in impregnating the water in casks, for use as hereinbefore described, as this can be done in any well-known way.

Great difficulties have been met heretofore in properly using preservative compositions containing saltpeter and sulphur. Either the composition would burn too rapidly and generate too great heat in and an unequal temperature throughout the vessel, or being consumed too quickly, the necessary time for fumigation would materially be shortened, and the articles, as a result, be imperfectly impregnated by the gases, thus giving imperfect and injurious results. We have, by experiment, discovered that the addition of licorice-root not only effectually overcomes this difficulty, but furnishes also a composition which gives greatly-improved results in the preservation of the articles exposed to the fumes thereof.

The licorice-root causes a steady continuous combustion of the composition until all is burned, and is so easily regulated that any person of limited knowledge may use the composition in the preservation of the various fruits, meats, &c., by observing the instructions as to the quantity of said chemicals to be employed for any given compartment or quantity of articles to be fumigated. The fumes of the licorice, combining with those of the saltpeter and sulphur, are forced into the substance, and, by reason of their highly-saccharine quality, greatly add to the preservative character of the composition. The licorice-root also gives a delicate and delicious flavor to the articles preserved.

We are aware that saltpeter, sulphur, and sugar or saccharine substances have been employed for preserving articles of food, &c., and we do not claim, broadly, their use, but, employed as herein described, the gain of control in volatilizing the chemicals. combined with the increased preservative quality, for the purposes specified.

We claim—

The composition of matter for fumigating purposes, hereinbefore described, consisting of sulphur, saltpeter, and pulverized licorice-root, in about the proportions specified.

In testimony that we claim the foregoing as our own we affix our signatures in presence of two witnesses.

GEORGE W. NICHOLLS.
THOS. H. BILYEU.

Witnesses:
W. A. CHESS,
JOHN W. STEEN.